(12) United States Patent
Tanazawa

(10) Patent No.: US 9,273,996 B2
(45) Date of Patent: Mar. 1, 2016

(54) OPTICAL RECEPTACLE AND OPTICAL MODULE PROVIDED WITH SAME

(71) Applicant: ENPLAS CORPORATION, Kawaguchi-shi, Saitama (JP)

(72) Inventor: Masahiro Tanazawa, Kawaguchi (JP)

(73) Assignee: ENPLAS CORPORATION, Kawaguchi-Shi (JP)

( * ) Notice: Subject to any disclaimer, the term of this patent is extended or adjusted under 35 U.S.C. 154(b) by 0 days.

(21) Appl. No.: 14/381,903

(22) PCT Filed: Jan. 18, 2013

(86) PCT No.: PCT/JP2013/050894
§ 371 (c)(1),
(2) Date: Aug. 28, 2014

(87) PCT Pub. No.: WO2013/132896
PCT Pub. Date: Sep. 12, 2013

(65) Prior Publication Data
US 2015/0060640 A1 Mar. 5, 2015

(30) Foreign Application Priority Data
Mar. 5, 2012 (JP) .................. 2012-047806

(51) Int. Cl.
*G01J 1/42* (2006.01)
*G02B 6/42* (2006.01)
*G01J 1/04* (2006.01)

(52) U.S. Cl.
CPC ............ *G01J 1/4257* (2013.01); *G01J 1/0411* (2013.01); *G02B 6/4214* (2013.01); *G02B 6/4286* (2013.01)

(58) Field of Classification Search
CPC ... G02B 6/4214; G02B 6/4286; G01J 1/4257; G01J 1/0411

USPC ............................ 250/201.1, 239; 385/38, 80
See application file for complete search history.

(56) References Cited

U.S. PATENT DOCUMENTS

| 2004/0234210 | A1* | 11/2004 | Nagasaka ............ G02B 6/4214 385/88 |
| 2006/0093011 | A1 | 5/2006 | Vancoille |
| 2009/0040628 | A1 | 2/2009 | Vancoille |
| 2010/0272403 | A1 | 10/2010 | Chen et al. |

(Continued)

FOREIGN PATENT DOCUMENTS

| EP | 2518550 A1 | 10/2012 |
| JP | H10-321900 A | 12/1998 |

(Continued)

OTHER PUBLICATIONS

International Search Report (ISR) mailed Mar. 26, 2013, issued for International application No. PCT/JP2013/050894.

*Primary Examiner* — Seung C Sohn
(74) *Attorney, Agent, or Firm* — Law Office of Kastsuhiro Arai

(57) ABSTRACT

An optical receptacle includes a light dividing surface that divides light from a light-emitting element into monitor light and coupling light to be coupled with an optical transmission body using total reflection. The light dividing surface includes a first curved surface that protrudes to the side opposite to a first surface from a first virtual reference surface having a slope angle of angle α[°] in relation to the first surface on a photoelectric conversion device side of an optical receptacle main body and a second curved surface that is connected to the first curved surface and protrudes to the side opposite to the first surface from a second virtual reference surface having a slope angle of angle β[°] in relation to the first surface, in which α and β satisfy α>β>critical angle.

7 Claims, 2 Drawing Sheets

(56) References Cited

U.S. PATENT DOCUMENTS

| | | | |
|---|---|---|---|
| 2011/0123151 A1* | 5/2011 | Zbinden | G02B 6/4214 385/33 |
| 2011/0134679 A1* | 6/2011 | Suh | G02B 6/4214 365/64 |
| 2011/0317959 A1* | 12/2011 | Ohta | G02B 6/4214 385/38 |

FOREIGN PATENT DOCUMENTS

| | | |
|---|---|---|
| JP | 2006-163372 A | 6/2006 |
| JP | 2010-282182 A | 12/2010 |
| JP | 2011-133807 A | 7/2011 |
| JP | 2011-211152 A | 10/2011 |
| WO | 2011/077723 A1 | 6/2011 |

\* cited by examiner

OPTICAL RECEPTACLE AND OPTICAL MODULE PROVIDED WITH SAME

This application is the U.S. National Phase under 35 U.S.C. §371 of International Application PCT/JP2013/050894, filed Jan. 18, 2013, which claims priorities to Japanese Patent Application No. 2012-047806, filed Mar. 5, 2012. The International Application was published under PCT Article 21(2) in a language other than English.

TECHNICAL FIELD

The present invention relates to an optical receptacle and an optical module including the optical receptacle. In particular, the present invention relates to an optical receptacle suitable for optically coupling a light-emitting element and an optical transmission body, and an optical module including the optical receptacle.

BACKGROUND ART

Since the past, an optical module has been used in optical communication using optical fibers, the optical module including a light-emitting element such as a surface light-emitting laser (for example, a vertical cavity surface emitting laser [VCSEL]).

In this type of optical module, an optical module component referred to as an optical receptacle is used. The optical receptacle is used in optical transmission via optical fiber by light that includes communication information and has been emitted from the light-emitting element being coupled with an end face of the optical fiber.

In addition, since the past, various proposals have been made regarding the optical module to monitor the light (intensity and amount of light) emitted from the light-emitting element, for the purpose of stabilizing output characteristics of the light-emitting element against temperature changes and adjusting optical output.

For example, Patent Literature 1 proposes an invention that is a lens array in which a reflective/transmissive layer is disposed within a recessing section of a lens array main body. The reflective/transmissive layer divides light from a light-emitting element into coupling light to be coupled with an optical fiber and monitor light.

Patent Literature 1: Japanese Patent Laid-open Publication No. 2011-133807

DISCLOSURE OF INVENTION

Problem to be Solved by the Invention

In the invention described in Patent Literature 1, the monitor light is acquired by reflection at the reflective/transmissive layer. In addition, the light amount ratio of the monitor light and the coupling light is adjusted by selection of the material and thickness of a metal single-layer film or a dielectric multilayer film composing the reflective/transmissive layer.

In this regard, the inventors of the present invention have conducted keen research to actualize acquisition of the monitor light and adjustment of the light amount ratio of the monitor light and the coupling light using a fewer number of components than the invention described in Patent Literature 1, and to ensure freedom in optical path layout. The result thereof is the present invention.

The present invention has been achieved in light of the above-described issues. An object of the present invention is to provide an optical receptacle capable of actualizing optical transmission accompanying monitoring by a simple configuration and ensuring freedom in optical path layout, and an optical module including the optical receptacle.

Means for Solving Problem

To achieve the above-described object, an optical receptacle according to first aspect of the present invention is an optical receptacle that is capable of optically coupling a light-emitting element and an optical transmission body in a state in which the optical receptacle is disposed between a photoelectric conversion device and the optical transmission body, the photoelectric conversion device having the light-emitting element and a light-receiving element that receives monitor light for monitoring light emitted from the light-emitting element. The optical receptacle includes: a first surface on the photoelectric conversion device side of an optical receptacle main body on which the light from the light-emitting element is incident and from which the monitor light directed towards the light-receiving element is emitted; a light dividing surface that is disposed on a second surface of the optical receptacle main body on the side opposite to the first surface so that the light from the light-emitting element that has been incident on the first surface is internally incident on the light dividing surface, and that divides the internally incident light from the light-emitting element into the monitor light and coupling light to be coupled with the optical transmission body using total reflection; a monitor light reflecting surface that is formed by an inner slope of a recessing section formed in a recessing manner on the second surface in a position on the side opposite to the total reflection direction of the monitor light and the coupling light in relation to the light dividing surface, and that reflects the monitor light that has been incident from the light dividing surface side towards a position on the first surface corresponding to the light-receiving element; and a third surface on the optical transmission body side of the receptacle main body from which the coupling light that has passed through a section of the recessing section further towards the second surface side than the monitor light reflecting surface is emitted towards the optical transmission body. In the optical receptacle, the light dividing surface includes: a first curved surface that is formed protruding to the side opposite to the first surface from a first virtual reference surface having a slope angle of angle α[°] in relation to the first surface; and a second curved surface that is connected to the first curved surface and is formed protruding to the side opposite to the first surface from a second virtual reference surface having a slope angle of angle β[°] in relation to the first surface, in which α and β satisfy a following conditional expression (1):

$$\alpha > \beta > \text{critical angle} \quad (1).$$

A portion of light from the light of the light-emitting element is internally incident on the first curved surface at an angle of incidence that is greater than the critical angle and totally reflected as the coupling light. A remaining portion of light from the light of the light-emitting element excluding the portion of light is internally incident on the second curved surface at an angle of incidence that is greater than the critical angle and less than the angle of incidence on the first curved surface and totally reflected as the monitor light.

In the invention according to the first aspect, the light of the light-emitting element can be divided into the monitor light and the coupling light using total reflection by the light dividing surface. Therefore, acquisition of the monitor light and adjustment of the light amount ratio of the monitor light and the coupling light can be actualized by only a geometrical configuration that is the surface shape of the light dividing surface. In addition, using the light collecting function and the total-reflection direction control function of the first curved surface and the second curved surface configuring the light dividing surface, the monitor light and the coupling light can be converged while being totally reflected towards a desired direction. Therefore, the optical path of each light can be freely laid out.

In addition, an optical receptacle according to a second aspect of the present invention is the optical receptacle according to the first aspect in which, further, the second curved surface is disposed on the first surface side in relation to the first curved surface.

In the invention according to the second aspect, the optical path of the monitor light that is emitted from the first surface via the monitor light reflecting surface can be more easily designed.

Furthermore, an optical receptacle according to a third aspect of the present invention is the optical receptacle according to claim 2 the first or second aspect in which, further, the first curved surface and the second curved surface are free-form surfaces.

In the invention according to the third aspect, the freedom in layout of the optical paths of the monitor light and the coupling light can be further improved.

Still further, an optical receptacle according to a forth aspect of the present invention is the optical receptacle according to claim 3 the first to third aspects in which, further, a first lens face is formed on the first surface, the first lens face enabling the light from the light-emitting element to be incident towards the light dividing surface. In addition, a second lens face is formed on the third surface, the second lens face emitting the coupling light towards the optical transmission body so as to converge the coupling light.

In the invention according to the forth aspect, coupling of the coupling light with the optical transmission body can be more suitably performed.

In addition, an optical receptacle according to a fifth aspect of the present invention is the optical receptacle according the forth aspect in which, further, respective surface peaks of the first curved surface and the second curved surface are disposed on a virtual plane that includes an optical axis on the first lens face and an optical axis on the second lens face.

In the invention according to the fifth aspect, a further simplified optical path design can be actualized.

Furthermore, an optical receptacle according to a sixth aspect of the present invention is the optical receptacle according to any one of the first to fifth aspects in which, further, the monitor light reflecting surface is a total reflection surface composed only of the inner slope of the recessing section disposed so that the monitor light is internally incident at an angle of incidence that is greater than the critical angle.

In the invention according to the sixth aspect, the number of components can be further reduced.

Still further, an optical module according to a seventh aspect of the present invention includes: the optical receptacle according to any one of claim 1 to claim 6 the first to sixth aspects; and the photoelectric conversion device according to claim 1 the first aspect.

In the invention according to the seventh aspect, optical transmission accompanying monitoring can be actualized by only a geometrical configuration of the light dividing surface. In addition, using the light collecting function and the total-reflection direction control function of the light dividing surface, freedom on optical path layout can be ensured.

Effect of the Invention

In the present invention, optical transmission accompanying monitoring can be actualized by a simple configuration and freedom in optical path layout can be ensured.

BEST MODE(S) FOR CARRYING OUT THE INVENTION

An embodiment of an optical receptacle and an optical module including the optical receptacle of the present invention will be described with reference to FIG. 1 to FIG. 3.

Figure 1:
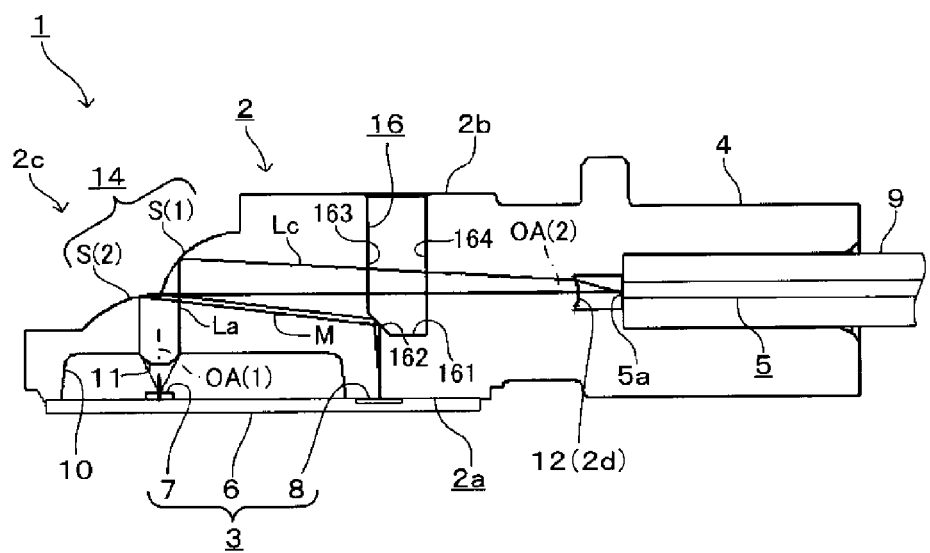
FIG. 1 A schematic configuration diagram of an optical receptacle and an optical module including the optical receptacle according to an embodiment of the present invention FIG. 2 A planar view of the optical receptacle shown in FIG. 1

FIG. 1 is a schematic configuration diagram showing an overview of an optical module 1 according to the present embodiment together with a vertical cross-sectional view of an optical receptacle 2 according to the present embodiment. In addition, FIG. 2 is a planar view of the optical receptacle 2 shown in FIG. 1. The optical receptacle 2 shown in FIG. 2 corresponds to a cross-section taken along A-A in FIG. 2.

As shown in FIG. 1, the optical receptacle 2 (optical receptacle main body) according to the present embodiment is disposed between a photoelectric conversion device 3 and an optical fiber 5 that serves as an optical transmission body.

Here, the photoelectric conversion device 3 in FIG. 1 is a substrate-mounted photoelectric conversion device 3. In other words, as shown in FIG. 1, the photoelectric conversion device 3 has a single light-emitting element 7 on a surface (top surface) of a semiconductor substrate (circuit board) 6 on the optical receptacle 2 side, the light-emitting element 7 emitting a laser light La in a direction perpendicular to this surface (upwards). The semiconductor substrate 6 is disposed in parallel with a lower end surface 2a of the optical receptacle 2. The light-emitting element 7 configures the above-described VCSEL. In addition, the photoelectric conversion device 3 has a single light-receiving element 8 on the surface of the semiconductor substrate 6 on the optical receptacle 2 side, in a position to the right of the light-emitting element 7 in FIG. 1, the light-receiving element 8 receiving a monitor light M for monitoring output (such as intensity and amount of light) of the laser light La emitted from the light-emitting element 7. The light-receiving element 8 may be a photodetector. Furthermore, electronic components, such as a control circuit that controls the output of the laser light La emitted from the light-emitting element 7 based on the intensity and the amount of light of the monitor M received by the light-receiving element 8, are mounted on the surface of the semiconductor substrate 6 on the optical receptacle 2 side (not shown). The electronic components are electrically connected to the light-emitting element 7 and the light-receiving element 8 by wires. The photoelectric conversion device 3 such as this, together with the optical receptacle 2, configures the optical module 1 by, for example, the photoelectric conversion device 3 being attached to the optical receptacle 2 by a known fixing means, such as an adhesive (for example, a thermoset or ultra-violet hardening resin) disposed between the semiconductor substrate 6 and the optical receptacle 2.

In addition, as shown in FIG. 1, a section of the optical fiber 5 on an end face 5a side that has a predetermined length is detachably attached, together with a circular-cylindrical ferrule 9 that holds this section, in a cylindrical optical fiber attaching section 4 that is formed in the optical receptacle 2. In this attached state, the section of the optical fiber 5 on the end face 5a side (the section housed within the optical fiber attaching section 4) is parallel with the semiconductor substrate 6. The optical fiber 5 may be either a single-mode optical fiber or a multi-mode optical fiber.

In a state in which the optical receptacle 2 is disposed between the photoelectric conversion device 3 and the optical fiber 5 such as those described above, the optical receptacle 2 optically couples the light-emitting element 7 and the end face 5a of the optical fiber 5.

The optical receptacle 2 will be described in further detail. As shown in FIG. 1, the outer shape of a main section of the optical receptacle 2 having various optical surfaces is formed into a substantially trapezoidal shape. In other words, as shown in FIG. 1 and FIG. 2, the main section of the optical receptacle 2 configures an overall outer shape by the lower end surface 2a that serves as a first surface, an upper end horizontal surface 2b and an upper end sloped surface 2c that serve as a second surface, a right end surface 2d that serves as a third surface, a front end surface 2e, and a rear end surface 2f. The lower end surface 2a and the upper end horizontal surface 2b are parallel with each other. The above-described optical fiber attaching section 4 is formed such as to extend towards the right side from the right end face 2d.

The optical receptacle 2 such as that described above can, for example, be integrally formed by injection molding using a resin material such as polyetherimide.

As shown in FIG. 1, a first recessing section 10 is formed on the lower end surface 2a of the optical receptacle 2, the first recessing section 10 having a substantially trapezoidal cross-sectional shape that recesses upwards in relation to the lower end surface 2a. As shown in FIG. 1, a single first lens face 11 is formed on an inner bottom surface of the first recessing section 10. The first lens face 11 is formed having a circular planar shape, and is formed into a spherical or aspherical convex lens face of which the convex surface faces the light-emitting element 7 side. The axial direction of an optical axis OA(1) on the first lens face 11 may be perpendicular to the inner bottom surface of the first recessing section 10 and remaining areas of the lower end surface 2a.

As shown in FIG. 1, in a state in which the photoelectric conversion device 3 is attached to the optical receptacle 2, the laser light La emitted from the light-emitting element 7 is incident on the first lens face 11, such as that described above, from below. Then, the first lens face 11 converges (for example, collimates) the incident laser light La and advances the laser light La into the interior of the optical receptacle 2.

Figure 2:
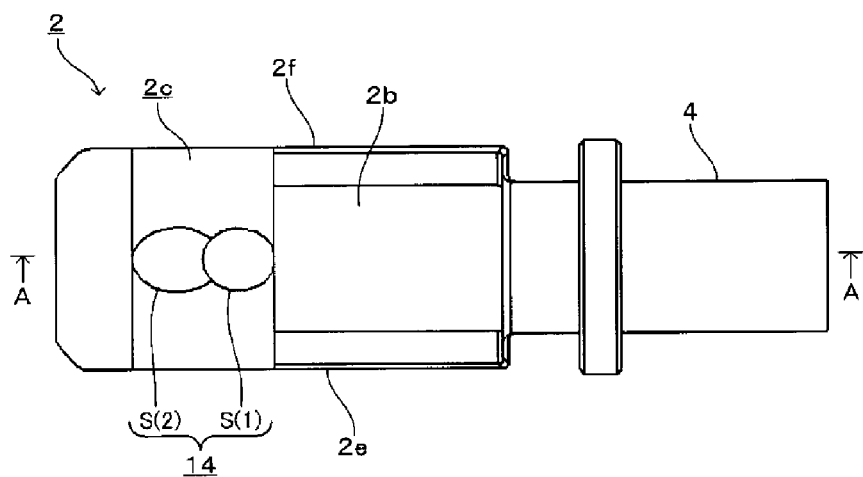

In addition, as shown in FIG. 1 and FIG. 2, the above-described upper end sloped surface 2c of the optical receptacle 2 is disposed on the side opposite to the first lens face 11. A light dividing surface 14 is disposed on the upper end sloped surface 2c. The laser light La from the light-emitting element 7 that has entered the first lens face 11 is internally incident on the light dividing surface 14 from below. The light dividing surface 14 then divides the internally incident laser light La from the light-emitting element 7 into the monitor light M and a coupling light Lc to be coupled with the optical fiber 5, using total reflection.

Figure 3:
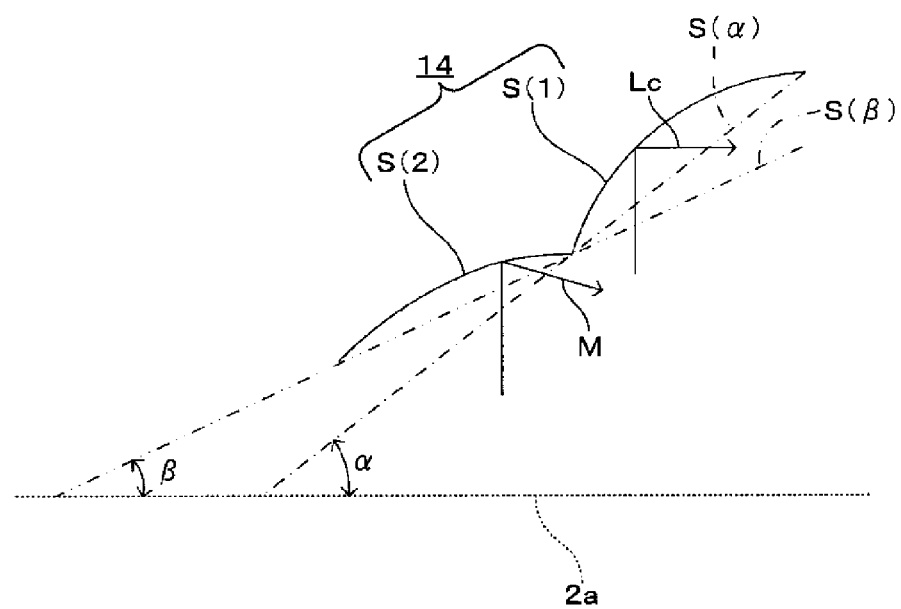
FIG. 3 An enlarged view of main sections of the optical receptacle shown in FIG. 1

More specifically, as shown in FIG. 3, the light dividing surface 14 is composed of a first curved surface S(1) and a second curved surface S(2). The first curved surface S(1) is formed so as to protrude to the side opposite to the lower end surface 2a from a first virtual reference surface S(α) that has a slope angle of angle α[°] in relation to the lower end surface 2a. The second curved surface S(2) is formed so as to be connected to the first curved surface S(1) and so as to protrude towards the side opposite to the lower end surface 2a from a second virtual reference surface S(β) that has a slope angle of angle β[°] in relation to the lower end surface 2a.

In addition, α and β satisfy a conditional expression indicated in (1) below.

$$\alpha > \beta > \text{critical angle} \quad (1)$$

A portion of light from the laser light La of the light-emitting element 7 is internally incident on the first curved surface S(1) at an angle of incidence that is greater than the critical angle. The first curved surface S(1) totally reflects the portion of light towards the right side in FIG. 1 and FIG. 3 as the coupling light Lc. At the same time, a portion of light from the laser light La of the light-emitting element 7 other than the light incident on the first curved surface S(1) is internally incident on the second curved surface S(2) at an angle of incidence that is greater than the critical angle and less than the angle of incidence on the first curved surface S(1). The second curved surface S(2) totally reflects the portion of light towards the lower right side in FIG. 1 and FIG. 3 as the monitor light M.

As shown in FIG. 1 and FIG. 3, according to the present embodiment, the second curved surface S(2) is connected further towards the lower end surface 2a side (lower side) than the first curved surface S(1) and on the side (right side) opposite to the total reflection direction of the coupling light Lc. Therefore, the coupling light Lc advances on an optical path that is further above the monitor light M.

Returning to FIG. 1, a second recessing section 16 that has a substantially pentagonal cross-sectional shape is formed recessing downwards on the upper end horizontal surface 2b of the optical receptacle 2 connected to the upper end sloped surface 2c on the side (right side in FIG. 1) of the total reflection direction of the monitor light M and coupling light Lc. As shown in FIG. 1, the second recessing section 16 has an inner slope 162 that is connected to a left end portion of an inner bottom surface 161 of the second recessing section 16. The inner slope 162 serves as a monitor light reflecting surface 162. The monitor light reflecting surface 162 is formed into a sloped plane that slopes further towards the upper end horizontal surface 2b side (upper side) as the monitor light reflecting surface 162 approaches the light dividing surface 14 side (left side).

As shown in FIG. 1, the monitor light M that has been totally reflected by the light dividing surface 14 is internally incident on the monitor light reflecting surface 162, such as that described above, at an angle of incidence that is greater than the critical angle. Then, the monitor light reflecting surface 162 totally reflects the internally incident monitor light M towards a position on the lower end surface 2a corresponding to the light-receiving element 8. The monitor light M that has been totally reflected by the monitor light reflecting surface 162 in this way is emitted from the lower end surface 2a and is coupled with the light-emitting element 8.

On the other hand, an inner left surface 163 that is connected to the upper end of the monitor light reflecting surface 162 of the second recessing section 16 and an inner right surface 164 opposing the inner left surface 163 are provided parallel with each other and perpendicular to the lower end surface 2a.

As shown in FIG. 1, the coupling light Lc that has been totally reflected by the light dividing surface 14 advances towards the optical fiber side 5 through the area between the inner left surface 163 and the inner right surface 164 of the second recessing section 16.

In addition, as shown in FIG. 1, the right end surface 2d in the main section of the optical receptacle 2 is formed into a second lens face 12 that faces the end face 5a of the optical fiber 5. The second lens face 12 is formed having a circular planar shape, and is formed into a spherical or aspherical convex lens face of which the convex surface faces the side of the end face 5a of the optical fiber 5. An optical axis OA(2) on the second lens face 12 preferably matches the center axis of the end face 5a of the optical fiber 5.

As shown in FIG. 1, the coupling light Lc that has passed through the second recessing section 16 is internally incident on the second lens face 12, such as that described above. The second lens face 12 then converges the internally incident coupling light Lc and emits the coupling light Lc towards the end face 5a of the optical fiber 5.

In the above-described configuration, the laser light La of the light-emitting element 7 can be divided into the monitor light M and the coupling light Lc using total reflection by the light dividing surface 14. Therefore, acquisition of the monitor light M and adjustment of the light amount ratio of the monitor light M and the coupling light Lc can be actualized by only a geometrical configuration that is the surface shape of the light dividing surface 14. In addition, using the light collecting function and the total-reflection direction control function of the first curved surface S(1) and the second curved surface S(2) configuring the light dividing surface 14, the monitor light M and the coupling light Lc can be converged while being totally reflected towards a desired direction. Therefore, the optical path of each light can be freely laid out.

In addition, in the above-described configuration, the second curved surface S(2) that totally reflects the monitor light M can be positioned further towards the lower end surface 2a side than the first curved surface S(1) that totally reflects the coupling light Lc. Therefore, the optical path of the monitor light M that is emitted from the lower end surface 2a via the monitor light reflecting surface 162 can be more easily designed.

Furthermore, in the above-described configuration, coupling of the coupling light Lc with the optical fiber 5 can be more suitably performed via the first lens face 11 and the second lens face 12.

Still further, in the above-described configuration, because the monitor light reflecting surface 162 can be configured by only the surface shape of the optical receptacle 2, the number of components can be further reduced.

In addition to the above-described configuration, further, the first curved surface S(1) and the second curved surface S(2) may each be a free-form surface.

In this instance, the free-form surface may be that expressed by the following expression when the Z axis is taken in the normal direction of the virtual reference surfaces S(α) and S(β), the X axis and the Y axis are taken in the directions perpendicular to the Z axis, the protruding direction of the curved surfaces S(1) and S(2) on the Z axis is positive, k represents a constant of the cone, Zs, Za, and Zc are coefficients, $r=(X^2+Y^2)^{1/2}$, and the maximum value of r is $r_{max}$.

$$Z=cr^2/[1+\{1-(1+k)c^2r^2\}^{1/2}]+Zs \cdot r^4/r_{max}^4+Za \cdot Y^2/r_{max}^2+(Zc \cdot r^2/r_{max}^2)\cdot(Y/r_{max}) \quad (2)$$

In this instance, the X axis may be taken in the depth direction of a lens array 2 (the direction perpendicular to the surface of the paper on which FIG. 1 is printed). The Y axis may be taken in the slope direction of the virtual reference surfaces S(α) and S(β).

As a result of a configuration such as this, the freedom in layout of the optical paths of the monitor light M and the coupling light Lc can be further improved.

Furthermore, in addition to the above-described configuration, further, the respective surface peaks of the first curved surface S(1) and the second curved surface S(2) may be disposed on a virtual plane (A-A cross-sectional surface) including the optical axis OA(1) on the first lens face 11 and the optical axis OA(2) on the second lens face 12.

In the configuration such as this, a further simplified optical path design can be actualized.

EXAMPLES

Next, a specific example of adjustment of the light amount ratio of the monitor light M and the coupling light Lc using the optical module 1 shown in FIG. 1 to FIG. 3 will be described in the present example.

In the present example, a lens array 2 is injection-molded using polyetherimide (PEI) having a refractive index of 1.64 in relation to λ=850 nm. The critical angle of the lens array 2 in the present example such as this is 38°.

In addition, in the present example, the first curved surface S(1) and the second curved surface S(2) are both free-form surfaces satisfying expression (1) and expression (2).

The specific parameters are as follows.
<First Curved Surface S(1)>
α=45°, c=1/−2.6580, X=1 [mm], Y=1.414 [mm], k=−62, $r_{max}$=0.707 [mm], Zs=−1.7504, Za=0.0876, Zc=0.0029.
<Second Curved Surface S(2)>
β=38°, c=1/−2.6580, X=1 [mm], Y=1.414 [mm], k=−62, $r_{max}$=0.707 [mm], Zs=−1.7504, Za=0.0876, Zc=0.0029.

As described above, the parameters other than the angles (α and β) of the virtual reference surfaces match (the shapes are the same) between the first curved surface S(1) and the second curved surface S(2). Therefore, the lengths of the respective optical paths from the curved surfaces S(1) and S(2) to the light-collecting point in terms of design based on only the respective surface shapes are the same.

In addition, in the present example, the respective surface peaks of the first curved surface S(1) and the second curved surface S(2) are disposed on the virtual plane (A-A cross-sectional surface) including the optical axis OA(1) of the first lens face 11 and the optical axis OA(2) of the second lens face 12.

Furthermore, in the present example, the optical axis OA(1) of the first lens face 11 is disposed on a boundary line between the first curved surface S(1) and the second curved surface S(2).

In the present example such as this, the light amount ratio of the monitor light M and the coupling light Lc can be adjusted to substantially 1:1, if loss caused by absorption, Fresnel reflection, and the like on the optical path is ignored. If the optical axis OA(1) is shifted to the side of one of either curved surface from the boundary line between the first curved surface S(1) and the second curved surface S(2), the amount of incident light on the one curved surface can be made greater than the amount of incident light on the other curved surface. Therefore, the light amount ratio of the monitor light M and the coupling light Lc can also be adjusted by adjusting the amount of such shifting of the optical axis OA(1) in relation to the boundary line.

The present invention is not limited to the above-described embodiment. Various modifications may be made to an extent that the characteristics of the present invention are not compromised.

For example, the present invention may be applied as an optical receptacle to a lens array in which the first lens faces 11 and the second lens faces 12 are each disposed in an array in the direction perpendicular to the surface of the paper on which FIG. 1 is printed. In this instance, a plurality of light-emitting elements 7 of the photoelectric conversion device 3 and a plurality of optical fibers 5 may be disposed based on the number of lens faces 11 and 12.

In addition, the present invention may be applied to an optical transmission body other than the optical fiber 5, such as an optical waveguide.

EXPLANATIONS OF LETTERS OR NUMERALS 1 optical module
2 optical receptacle
2a lower end surface
2b upper end horizontal surface
2c upper end sloped surface
2d right end surface
3 photoelectric conversion device
5 optical fiber
7 light-emitting element
8 light-receiving element
14 light dividing surface
16 second recessing section
162 monitor light reflecting surface

The invention claimed is:

1. An optical receptacle that is capable of optically coupling a light-emitting element and an optical transmission body in a state in which the optical receptacle is disposed between a photoelectric conversion device and the optical transmission body, the photoelectric conversion device having the light-emitting element and a light-receiving element that receives monitor light for monitoring light emitted from the light-emitting element, said optical receptacle comprising:

a first surface on the photoelectric conversion device side of an optical receptacle main body on which the light from the light-emitting element is incident and from which the monitor light directed towards the light-receiving element is emitted;

a light dividing surface that is disposed on a second surface of the optical receptacle main body on the side opposite to the first surface so that the light from the light-emitting element that has been incident on the first surface is internally incident on the light dividing surface, and that divides the internally incident light from the light-emitting element into the monitor light and coupling light to be coupled with the optical transmission body using total reflection;

a monitor light reflecting surface that is formed by an inner slope of a recessing section formed in a recessing manner on the second surface in a position on the side opposite to the total reflection direction of the monitor light and the coupling light in relation to the light dividing surface, and that reflects the monitor light that has been incident from the light dividing surface side towards a position on the first surface corresponding to the light-receiving element; and a third surface on the optical transmission body side of the receptacle main body from which the coupling light that has passed through a section of the recessing section further towards the second surface side than the monitor light reflecting surface is emitted towards the optical transmission body, wherein the light dividing surface includes
a first curved surface that is formed protruding to the side opposite to the first surface from a first virtual reference surface having a slope angle of angle α[°] in relation to the first surface, and
a second curved surface that is connected to the first curved surface and is formed protruding to the side opposite to the first surface from a second virtual reference surface having a slope angle of angle β[°] in relation to the first surface, wherein
α and β satisfy a following conditional expression (1)

$$\alpha > \beta > \text{critical angle} \quad (1)$$

a portion of light from the light of the light-emitting element is internally incident on the first curved surface at an angle of incidence that is greater than the critical angle and totally reflected as the coupling light, and a remaining portion of light from the light of the light-emitting element excluding the portion of light is internally incident on the second curved surface at an angle of incidence that is greater than the critical angle and less than the angle of incidence on the first curved surface and totally reflected as the monitor light.

2. The optical receptacle according to claim 1, wherein:
the second curved surface is disposed on the first surface side in relation to the first curved surface.

3. The optical receptacle according to claim 1, wherein:
the first curved surface and the second curved surface are free-form surfaces.

4. The optical receptacle according to claim 1, wherein:
a first lens face is formed on the first surface, the first lens face enabling the light from the light-emitting element to be incident towards the light dividing surface; and
a second lens face is formed on the third surface, the second lens face emitting the coupling light towards the optical transmission body so as to converge the coupling light.

5. The optical receptacle according to claim 4, wherein:
respective surface peaks of the first curved surface and the second curved surface are disposed on a virtual plane that includes an optical axis on the first lens face and an optical axis on the second lens face.

6. The optical receptacle according to claim 1, characterized in that wherein:
the monitor light reflecting surface is a total reflection surface composed only of the inner slope of the recessing section disposed so that the monitor light is internally incident at an angle of incidence that is greater than the critical angle.

7. An optical module comprising:
the optical receptacle according to claim 1; and
the photoelectric conversion device having the light-emitting element and the light-receiving element that receives monitor light for monitoring light emitted from the light-emitting element.

* * * * *

UNITED STATES PATENT AND TRADEMARK OFFICE
CERTIFICATE OF CORRECTION

PATENT NO. : 9,273,996 B2  
APPLICATION NO. : 14/381903  
DATED : March 1, 2016  
INVENTOR(S) : Masahiro Tanazawa Page 1 of 1

It is certified that error appears in the above-identified patent and that said Letters Patent is hereby corrected as shown below:

In The Claims

At column 10, lines 52 to 53, in Claim 6, please delete "characterized in that".

Signed and Sealed this
Third Day of May, 2016

Michelle K. Lee
*Director of the United States Patent and Trademark Office*